United States Patent
Haraguchi et al.

(10) Patent No.: US 10,191,469 B2
(45) Date of Patent: Jan. 29, 2019

(54) NUMERICAL CONTROL DEVICE FOR SAFETY APPROACH TO RESTARTING MACHINING POINT

(71) Applicant: FANUC Corporation, Minamitsuru-gun, Yamanashi (JP)

(72) Inventors: Takahiro Haraguchi, Yamanashi (JP); Makoto Haga, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 201 days.

(21) Appl. No.: 14/856,939

(22) Filed: Sep. 17, 2015

(65) Prior Publication Data

US 2016/0085232 A1 Mar. 24, 2016

(30) Foreign Application Priority Data

Sep. 18, 2014 (JP) .................................. 2014-189929

(51) Int. Cl.
*G05B 19/402* (2006.01)

(52) U.S. Cl.
CPC .. *G05B 19/402* (2013.01); *G05B 2219/50103* (2013.01)

(58) Field of Classification Search
CPC .................... G05B 19/402; G05B 2219/50103
USPC ......................................................... 700/184
See application file for complete search history.

(56) References Cited

U.S. PATENT DOCUMENTS

| | | | |
|---|---|---|---|
| 4,489,377 A * | 12/1984 | Mawyer ............. | G05B 19/4061 318/565 |
| 4,513,380 A * | 4/1985 | Spooner ............... | G05B 19/186 409/69 |
| 5,293,024 A * | 3/1994 | Sugahara ............... | B23K 26/08 219/121.67 |
| 5,793,635 A | 8/1998 | Niwa | |
| 2004/0153199 A1* | 8/2004 | Sagasaki ............ | G05B 19/4067 700/169 |

(Continued)

FOREIGN PATENT DOCUMENTS

| | | |
|---|---|---|
| CN | 101373379 A | 2/2009 |
| CN | 202306251 U | 7/2012 |

(Continued)

OTHER PUBLICATIONS

Decision to Grant a Patent dated Aug. 30, 2016 in Japanese Patent Application No. 2014-189929 (3 pages) with an English Translation (3 pages).

(Continued)

*Primary Examiner* — Robert E Fennema
*Assistant Examiner* — Jigneshkumar C Patel
(74) *Attorney, Agent, or Firm* — Drinker Biddle & Reath LLP

(57) ABSTRACT

A numerical control device includes an approach path calculation unit configured to calculate an approach path to the restarting machining point of the tool, a manual operation approach command unit, and an approaching operation switching unit, wherein the approaching operation switching unit is configured to receive switching request from an operator during the manual operation approach and switch to the automatic operation approach, or, receive manual intervention of the operator during the automatic operation approach and switch to the manual operation approach.

5 Claims, 7 Drawing Sheets

(56) References Cited

U.S. PATENT DOCUMENTS

| | | | |
|---|---|---|---|
| 2005/0209730 A1* | 9/2005 | Grund | G05B 19/4067 |
| | | | 700/186 |
| 2008/0018287 A1 | 1/2008 | Ogawa | |
| 2009/0055016 A1 | 2/2009 | Fujibayashi et al. | |
| 2011/0190915 A1 | 8/2011 | Fujishima et al. | |

FOREIGN PATENT DOCUMENTS

| | | |
|---|---|---|
| CN | 103092127 A | 5/2013 |
| EP | 0606649 A2 | 7/1994 |
| JP | H05-53621 A | 3/1993 |
| JP | H05-265523 A | 10/1993 |
| JP | 2008-015740 A | 1/2008 |
| WO | WO 03/032097 A1 | 4/2003 |

OTHER PUBLICATIONS

The Notification of First Office Action dated Jul. 4, 2017 in Chinese Patent Application No. 2015105942352 (5 pages) with an English translation (7 pages).

\* cited by examiner

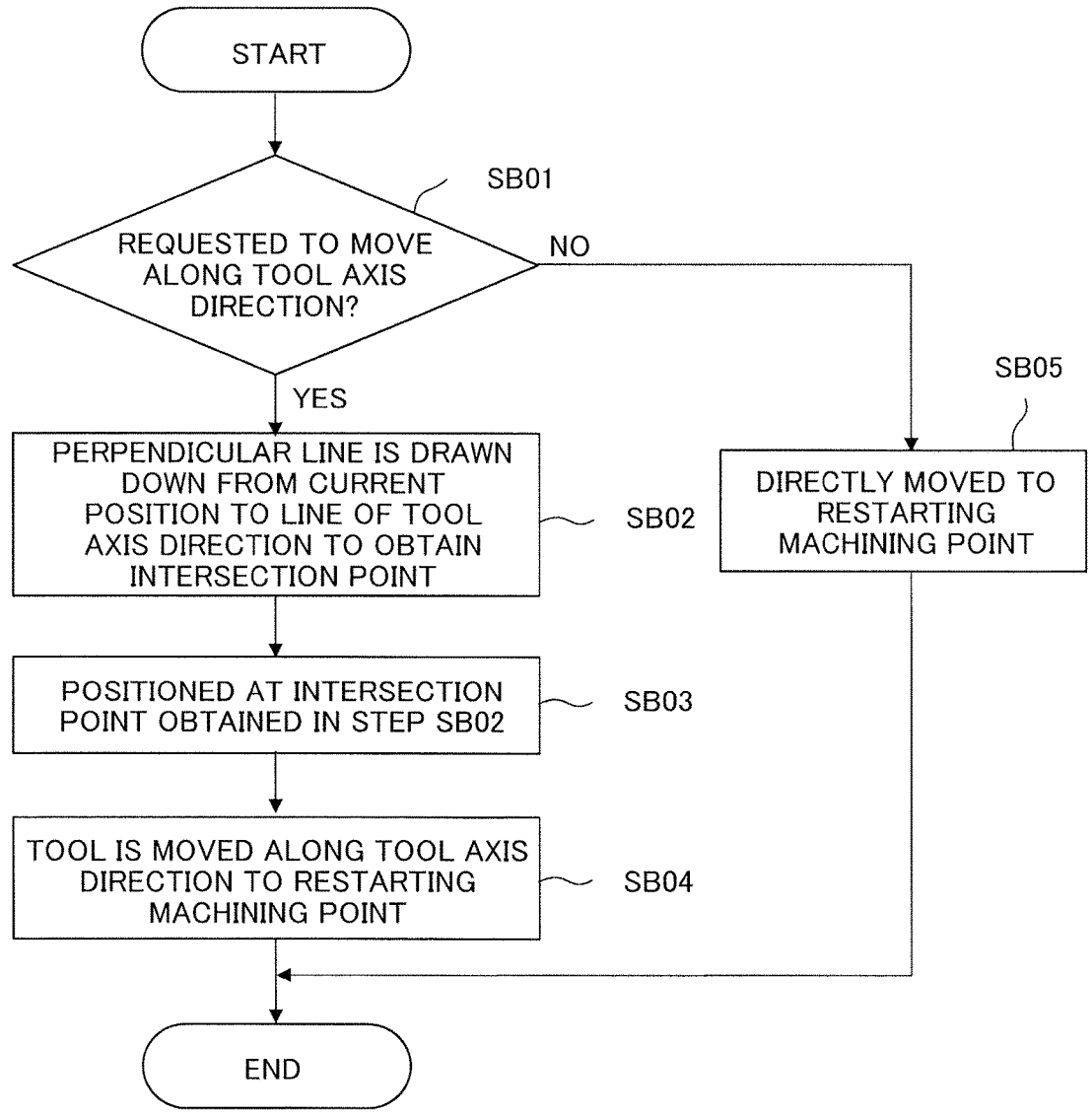

NUMERICAL CONTROL DEVICE FOR SAFETY APPROACH TO RESTARTING MACHINING POINT

RELATED APPLICATION DATA

This application claims priority under 35 U.S.C. § 119 and/or § 365 to Japanese Application No. 2014-189929 filed Sep. 18, 2014, the entire contents is incorporated herein by reference.

BACKGROUND OF THE INVENTION

1. Field of the Invention

The present invention relates to a numerical control device, and more particularly to a numerical control device which enables easy and safe approach to a restarting machining point when restarting the machining for an operator.

2. Description of the Related Art

In a machining tool controlled by a numerical control device, machining needed to be restarted at an interrupting block or an easily-restartable block before the interrupting block, when the tool is broken or the machining which is interrupted before a holiday is restarted after a holiday. In this case, it is necessary that the tool is moved (approached) from the current position to the target restarting block position. International Publication No. WO03/032097A1 discloses a related art to enhance convenience of the operator at the approaching.

In the related art described in the International Publication No. WO03/032097A1, in the case that the operator performs manual operation approach with a handle etc. and at least one of the corresponding axes does not move back to the restarting machining point, the corresponding axis is positioned directly by a movement command to the restarting machining point (automatic operation approach). Since a procedure opposite to the above mentioned procedure is not assumed, it is necessary to perform the restarting operation from the beginning again, for performing the manual operation approach again during the automatic operation approach.

Practically, manual intervention is assumed to take place for avoiding interference of a workpiece or a machinery member with the tool during the automatic operation approach, or the like. In this case, it is necessary to reset the machining tool and restart the operation in the technique described in the International Publication No. WO03/032097A1. There is a problem (hereinafter referred to as "Problem 1") that, since it is necessary, for the restart of the operation from the beginning, to select the restarting block, restore the modal data, and restart the restarting mode again, it takes time for the restarting and makes the operation by the operator complicated, for a large-scale program or the like.

In addition, there is a problem (hereinafter referred to as "Problem 2") in the International Publication No. WO03/032097A1 that, visual checking and manual operation by the operator is needed for restarting machining of a complicated workpiece in the technique described, since it is not considered to avoid interference of the tool with the workpiece during automatic operation approach, thought there is a possibility that the workpiece and the tool intervene with each other during the approach when machining of the workpiece with complicated configuration such as an impeller is restarted at the machining block.

Furthermore, there is a problem (hereinafter referred to as "Problem 3") in the International Publication No. WO03/032097A1 that, the numerical control device is not configured to output warning to the operator even when the direct movement of the tool from the current position by the automatic operation approach will cause interference, since the numerical control device does not check detailed positional relation such as distance between the restarting machining point and the current position when the automatic operation approach starts.

SUMMARY OF THE INVENTION

In view of the above-described problems in the prior art techniques, a purpose of the present invention is to provide a numerical control device which enables easy and safe approach to the restarting machining point when restarting the machining for an operator.

The numerical controller according to the present invention is a numerical control device for moving a tool to a restarting machining point when restarting machining after the machining based on machining program is interrupted, the numerical control device including, an approach path calculation unit configured to calculate an approach path to the restarting machining point of the tool, a manual operation approach command unit configured to receive a manual operation approach instruction by an operator, and an approaching operation switching unit configured to switch automatic operation approach and manual operation approach. The approaching operation switching unit is configured to receive switching request from the operator during the manual operation approach and switch to the automatic operation approach, or, receive manual intervention of the operator during the automatic operation approach and switch to the manual operation approach.

The approach path calculation unit may calculate the approach path such that the tool, the tool axis set in tool axis direction at a point of the machining interruption, is moved to a nearest point from current position in a line of the tool axis direction passing through the restarting machining point, and the tool is moved along the tool axis direction at the point of the machining interruption to the restarting machining point.

The numerical control device may further includes an approach region storing unit configured to define approach region as tool position range of the tool, the tool is configured to be safely moved therefrom to the restarting machining point by the automatic operation, and the approaching operation switching unit may output warning when current position of the tool is out of the approach region at a point of receiving approach command by the automatic operation approaching.

The present invention, with the configuration above mentioned, enables easy and safe approach to the restarting machining point for an operator. Productivity is enhanced since machining is resumed quickly when the machining is interrupted by the tool breakage, electrical power outage, or the like.

BRIEF DESCRIPTION OF THE DRAWINGS

The above-described object, the other object, and the feature of the invention will be proved from the description of embodiments below with reference to the accompanying drawings. In these drawings:

FIG. 7 is a flowchart showing approaching path calculation process according to an embodiment of the present invention.

DETAILED DESCRIPTION OF THE PREFERRED EMBODIMENTS

First, the present invention will be outlined.

In a few embodiments according to the present, a unit is provided for switching the automatic operation approach and manual operation approach during the approach to the restarting machining point, as the solution of Problem 1.

Figure 1:
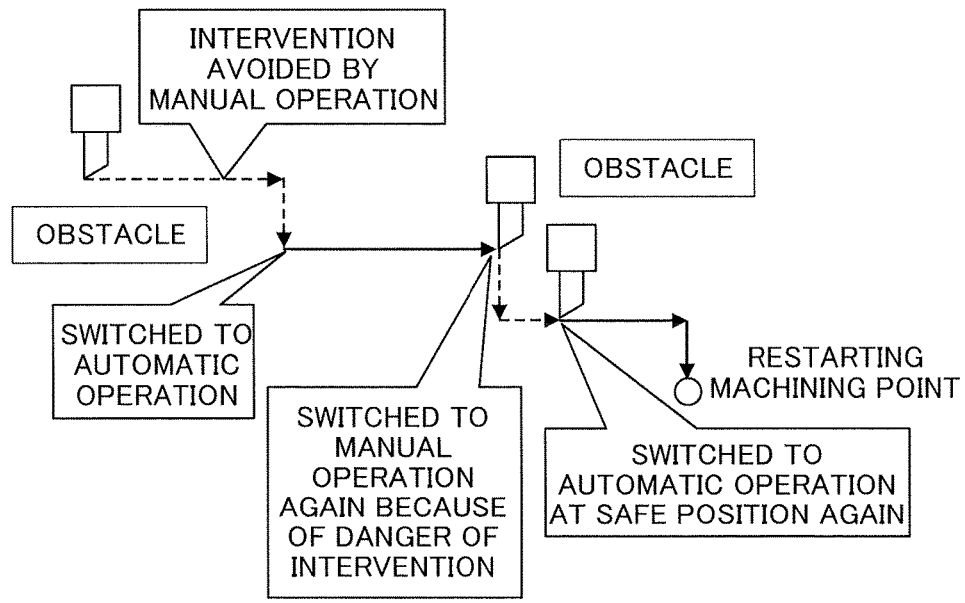
FIG. 1 is a schematic diagram showing approaching operation of a tool to the restarting point according to the present invention.

The provided configuration enables manual intervention during the approach without restarting the restarting mode from the beginning again, so such operation is enabled that, the manual operation approach is performed to avoid interference when the tool is located near an obstacle which may intervene with the tool as shown in FIG. 1, and the manual operation approach is switched to the automatic operation approach after the interference with the obstacle is avoided. Here, the dashed line in FIG. 1 designates the manual operation approach, while the solid line in FIG. 1 designates the automatic operation approach.

In a few embodiments according to the present, a unit is provided for moving the tool along the tool axis direction at the restarting machining point, in the automatic operation approach after the tool is moved to a safe position by hand, as the solution of Problem 2.

Figure 2:
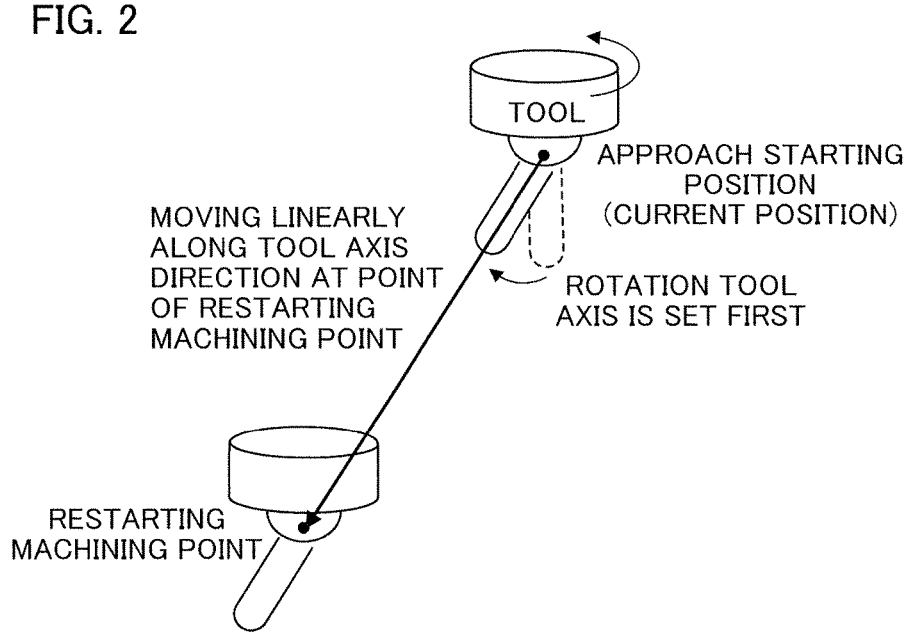
FIG. 2 is a schematic diagram showing approaching operation along the tool axis direction at the restarting point according to the present invention.

The provided configuration enables to automatically avoid interference of the tool with the workpiece during machining the workpiece with complicated configuration, by locating the tool axis before the tool approaches to the workpiece and moving the tool linearly along the direction of the tool axis at the point of the restarting machining point as shown in FIG. 2, such that it become possible to conduct the automatic operation approach.

In a few embodiments according to the present, a unit is provided for setting fixed region as approach region. The numerical control device uses the approach region to determine whether the tool is in safe position or not, as the solution of the above described Problem 3.

The provided configuration enables such operation that, whether the tool is within approach region or not is determined when automatic operation approach is requested, then the automatic operation approach is performed when the tool is within the approach region while warning is output for the operator when the tool is out of the approach region, urging the operator to move the tool to the restarting machining point by manual operation approach because the automatic operation approach is dangerous.

Configuration of the numerical control device for implementing the solutions will be described below.

Figure 4:
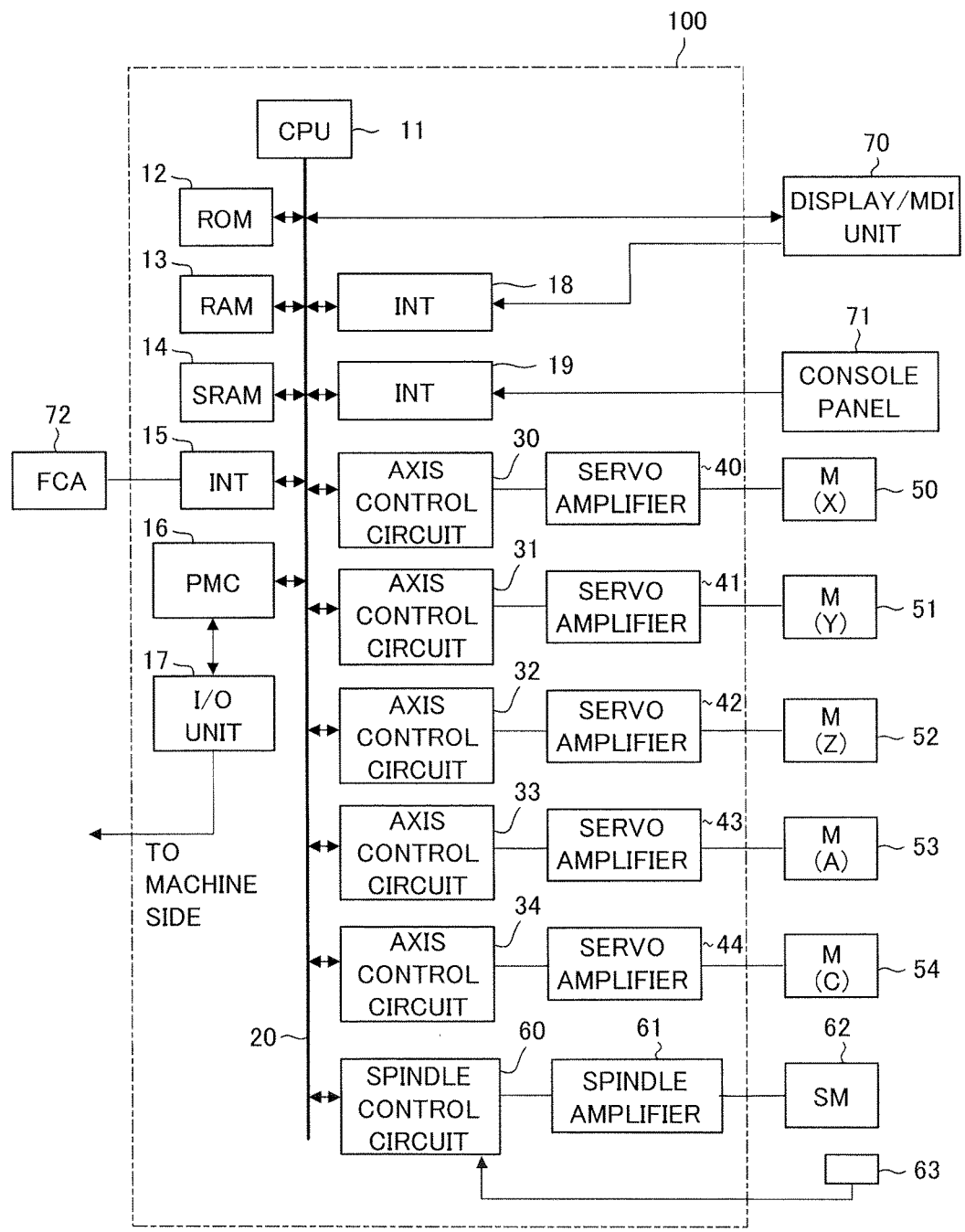
FIG. 4 is a schematic block diagram showing a numerical control device according to an embodiment of the present invention.

FIG. 4 is a schematic block diagram showing a numerical control device (CNC) 100 according to an embodiment of the present invention. CPU 11 controls whole numerical control device 100. CPU 11 reads out system program stored in ROM 12 via bus 20, and controls whole numerical control device according to the system program. RAM 13 stores temporary numerical data, display data, and various kinds of data input by an operator via a display/MDI unit 70.

SRAM 14 is backed up by a battery not shown in the figure, and configured as a non-volatile memory which retains its storage state even when the numerical control device 100 is turned off. The SRAM 14 stores the machining program read in via an interface 15, the machining program input via the display/MDI unit 70, and the like. Various kinds of system programs for executing editing mode process needed for generating and editing the machining program and for executing automatic operation process.

Various kinds of machining programs, such as the machining program according to the present embodiment, are input via the interface 15 or the display/MDI unit 70 and stored in the SRAM 14.

The interface 15 enables connection between the numerical control device 100 and an external device 72 such as an adaptor. The machining programs, various kinds of parameters or the like are read in from the external device 72 side. The machining program, edited in the numerical control device 100, is stored in an external storage device via the external device 72. PMC (programmable machine controller) 16 outputs signal to an auxiliary device of the machining tool via I/O unit 17 to control the auxiliary device, based on a sequence program stored in the numerical control device 100. The auxiliary device of the machining tool includes an actuator such as a robot hand for changing tools. The PMC receives signals from various kinds of switches on a console panel installed in a main body of the machining tool, to execute necessary signal processing and transfer the signals to the CPU 11.

The display/MDI unit 70 is a manual data input device including a display, a keyboard, and the like. The interface 18 receives a command or data from the keyboard of the display/MDI unit 70 to transfer them to the CPU 11. The interface 19 is connected to the console panel 11 including a manual pulse generator and the like.

Each of axis control circuits 30 to 34 of each axis receives a moving amount command of each axis from the CPU 11 and outputs the command of each axis to servo amplifiers 40 to 44. Servo amplifiers 40 to 44 receive the command and drive servo motors 50 to 54 of each axis. The servo motors 50 to 54 of each axis includes position/velocity detector and feedbacks velocity feedback signal from the position/velocity detector to the axis control circuits 30 to 34, for feedback control of position and velocity. In the block diagram, feedback of the position and the velocity is not shown.

Spindle control circuit 60 receives spindle rotation command to the machining tool and output a spindle velocity signal to a spindle amplifier 61. The spindle amplifier 61 receives the spindle velocity signal and rotates a spindle motor 61 of the machining tool at the commanded rotation speed and drives the tool.

The spindle motor 62 is coupled to a position coder 63 through a gear or a belt. The position coder 63 outputs a feedback pulse synchronized with the spindle rotation. The CPU 11 read the feedback pulse via the bus 20.

Figure 5:
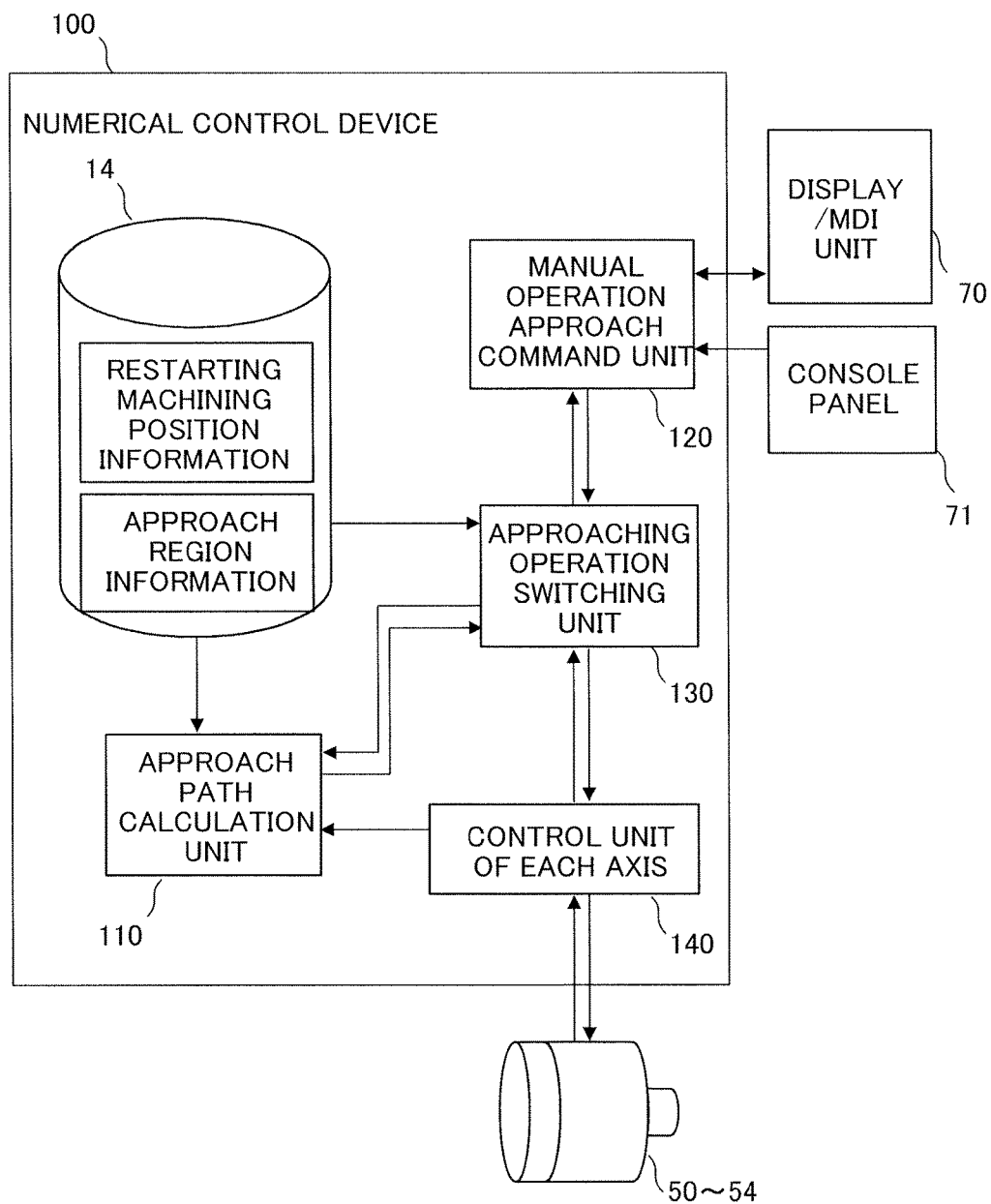
FIG. 5 is a functional block diagram showing a numerical control device according to an embodiment of the present invention.

FIG. 5 is a functional block diagram showing the numerical control device 100 according to an embodiment of the present invention.

The numerical control device 100 includes an approach path calculation unit 110, a manual operation approach command unit 120, an approaching operation switching unit 130, a control unit 140 of each axis. The SRAM 14 stores information of the restarting machining point stored when the machining is interrupted and setting information of the approach region which will be described later.

The approach path calculation unit 110 execute the approach path calculation process, which will be described later, based on the information of restarting machining point stored in the SRAM 14 and the information of current tool position feedback from the servo motors 50 to 54 of each axis, to calculate the approach path to the restarting machining point of the tool and output the approach command based on the calculated approach path to the approaching operation switching unit 130.

The manual operation approach command unit 120 has function of outputting automatic operation approach/manual operation approach switching instruction and movement command for manual operation approach to the approach switching unit 130, while the manual operation approach command unit 120 receives warning information or the like from the approaching operation switching unit 130 and outputs the warning information to the display/MDI unit 70.

The approaching operation changing unit 130 switches approaching operation mode based on the instruction of the operator sent from the manual operation approach command unit 120 or the like, such that the approach command input from the approach path calculation unit is output to the control unit 140 of each axis during the automatic operation mode, while the approach command from the manual operation approach command unit is output to the control unit 140 of each axis during the manual operation mode.

In addition to that, the approaching operation changing unit 130 determines whether the current tool position, feedback from the servo motors 50 to 54 of each axis, is within the approach region designated by the approach region information stored in the SRAM 14, on receiving a command to change to the automatic operation from the manual operation approach command unit 120. The approaching operation changing unit 130 outputs warning information to the manual operation approach command unit 120 when the current tool position is not within the approach range.

The control unit 140 of each axis outputs movement command to the servo motors 50 to 54 based on the command for each servo motor input from the approaching operation changing unit 130.

Figure 6:
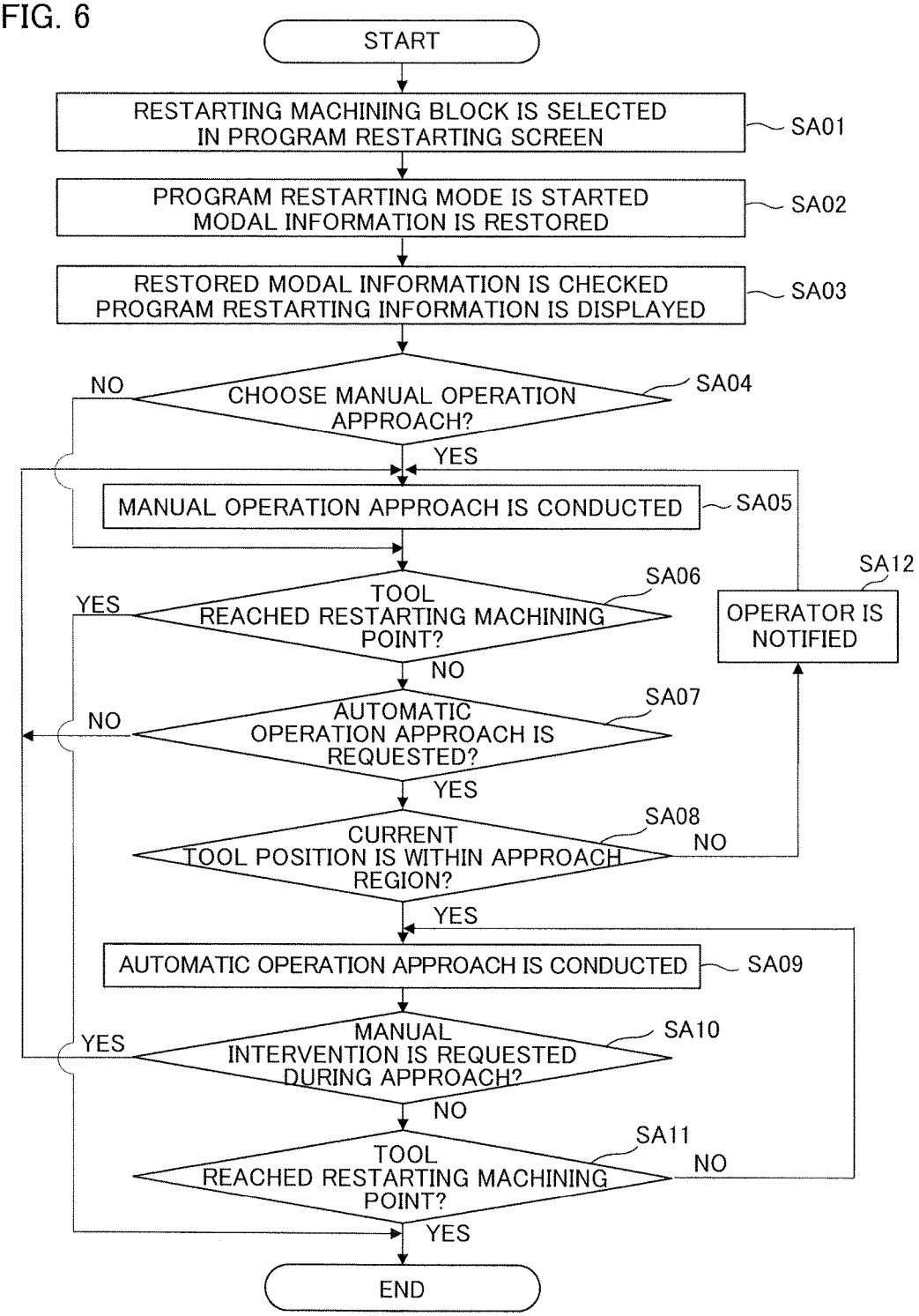
FIG. 6 is a flowchart showing approaching process according to an embodiment of the present invention.

FIG. 6 is a flowchart showing approaching process according to an embodiment of the present invention.

In the flowchart, the cause of the machining interruption is presumed to be solved. For example, the current state is presumed to be the state where, if machining is interrupted because of tool breakage, the broken tool is retracted from the interruption position and moved to the tool exchange position such that the tool is exchanged.

[Step SA01] The display/MDI unit 70 displays program restarting screen and receives instruction of a block for restarting machining by operation of an operator.

[Step SA02] Program restarting mode is started after the block selection by the operator in Step SA01. At this time, modal information or the like is automatically restored to the state at the interruption.

[Step SA03] The display/MDI unit 70 shows operation to be done next by the operator and the current state for restarting the program based on the restored modal information in Step SA02. For example, remaining moving amount to the restarting machining point is shown to clearly specify in which direction the axis will move in the approach. In addition, the operator is notified to conduct manual operation approach when the automatic operation approach is dangerous because the machine coordinate differs from the absolute coordinate which is caused by coordinate conversion.

[Step SA04] The operator chooses whether to conduct manual operation approach or not. When the manual operation approach is not chosen, the automatic operation approach is requested and the process proceeds to Step SA06.

[Step SA05] The operator is instructed to conduct the manual operation approach to the target position of the restarting machining point, and the manual operation approach is conducted according to the input from the console panel 71.

[Step SA06] The current tool position is always monitored during the manual operation approach, and the remaining process is skipped and the approach to the restarting machining point is determined to be completed when the tool reaches the restarting machining point.

[Step SA07] The approaching operation switching unit 130 checks whether the automatic operation approach is requested or not. The process proceeds to Step SA08 when the automatic operation approach is requested, and the manual operation approach is continued when the automatic operation approach is not requested.

[Step SA08] The approaching operation changing unit 130 determines whether the current position is within the approach region or not. The process proceeds to Step SA09 when the current position is within the approach region, and the process proceeds to Step SA12 when the current position is not within the approach region.

[Step SA09] The approaching operation changing unit 130 commands the approach path calculation unit 110 to calculate the approach path to move the tool to the restarting machining point, and starts the automatic operation approach, when the current position is within the approach region. In the automatic operation approach, the tool axis is set in tool axis direction at the restarting machining point first. Then the tool is moved along the tool axis direction, such that the interference of the tool with the workpiece is avoided. Details of the automatic operation approach will be described later.

[Step SA10] The automatic operation approach is stopped when the manual operation approach command is input by the operator during the automatic operation approach, and the manual operation approach is conducted again. Thus manual intervention is conducted with ease when the operator noticed the possibility of interference after the start of the automatic operation approach.

[Step SA11] The current tool position is always monitored during the automatic operation approach. The approach to the restarting machining point is determined to be completed when the tool reaches the restarting machining point. The approach is continued when the tool does not reach the restarting machining point.

[Step SA12] The operator is notified to move the tool to the approach region by manual operation and the manual operation approach is conducted.

FIG. 7 is a flowchart showing approaching path calculation process executed in the approach path calculation unit 110.

[Step SB01] It is determined whether to move the tool along the tool axis direction or not, according to the request signal or the like by the operator. The numerical control device may automatically determine whether to move the tool along the tool axis direction or not based on the modal information and the like. The process proceeds to Step SB02 when the tool is moved along the tool axis direction, and proceeds to Step SB05 when the tool is not moved along the tool axis direction.

Figure 3:
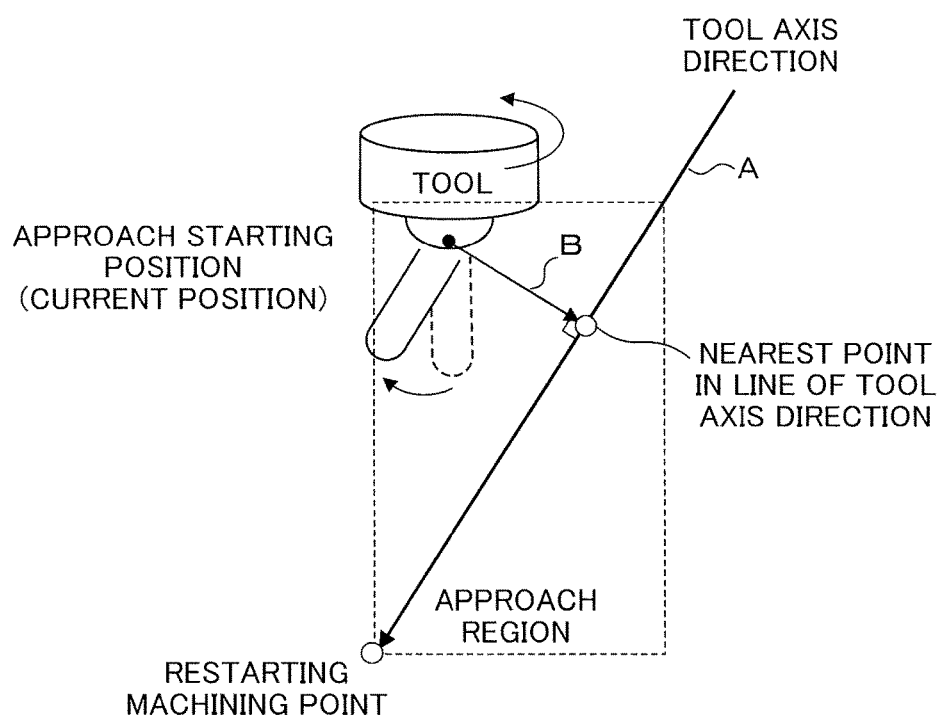
FIG. 3 is a diagram showing approach region according to the present invention.

[Step SB02] The nearest point in a line of the tool axis direction is calculated. That is, as shown in FIG. 3, a perpendicular line "B" is drawn down from the current tool position to the line "A" of the tool axis direction passing through the restarting machining. The point at the intersection of the line "A" and the perpendicular line "B" is the nearest point in a line of the tool axis direction.

[Step SB03] The axis of the tool is set in the tool axis direction at the point of the restarting machining point, then the tool is position at the nearest point calculated in Step SB02. The tool may be positioned by moving each axis one by one or by moving the tool along the perpendicular line "B".

[Step SB04] The tool is moved along the tool axis direction to the restarting machining point after the tool is positioned at the nearest point in a line in the tool axis direction.

[Step SB05] The tool is positioned directly at the restarting machining point. The tool may be positioned by moving each axis one by one or by moving all axes at once using linear interpolation.

The approach region will be described below. The approach region works as the criteria to determine whether the tool is in safe position or not for the automatic operation approach. As shown in FIG. 6, the numerical control device according to the present embodiment determines whether the current position is within the approach region, which is set for the restarting machining point. The automatic operation approach starts when the current position is within the approach region, while the operator is notified with a warning that the direct approach by automatic operation is dangerous and instructed to move the tool to the restarting machining point by manual operation approach when the current position is not within the approach region.

Examples where the approach region is set, according to the present embodiment, will be described using FIGS. 8A, 8B, 9A, 9B, and 10.

Figure 8A:
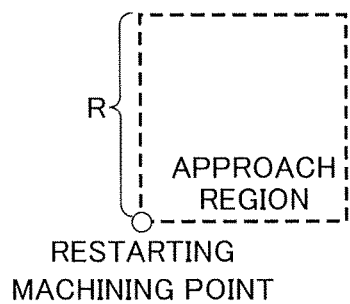
FIGS. 8A, 8B are diagrams showing an example where the approach region is set by fixed value R according to an embodiment of the present invention.
Figure 8B:
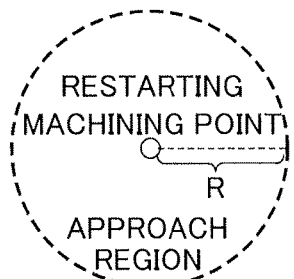

FIGS. 8A, 8B show an example where the approach region is set by fixed value R based on the restarting machining point. FIG. 8A shows an example which designates the approach region as a quadrate, where the restarting machining point is positioned at the apex thereof and the length of one side thereof is equal to the fixed value R. FIG. 8B shows an example which designates the approach region as a circle whose radius is equal to the fixed value R. The examples bases on the idea that it will not be dangerous even if the automatic operation approach is conducted, when the tool approaches the restarting machining point to a predetermined distance.

The fixed value R may be preset in setting region of the numerical control machine, or may be configured to be designated by parameter, signal, modal value commanded in the program, or the like.

Figure 9A:
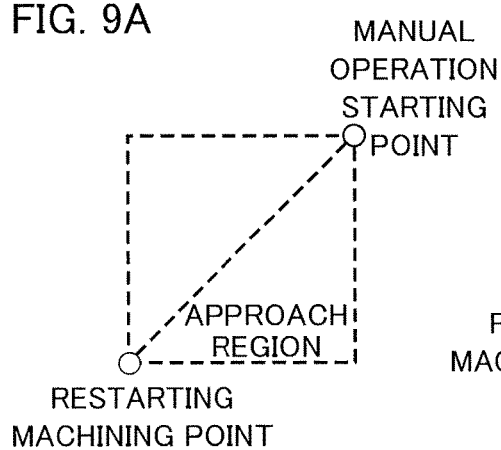
FIGS. 9A, 9B are diagrams showing an example where the approach region is set based on the manual operation starting point and the restarting machining point according to an embodiment of the present invention.
Figure 9B:
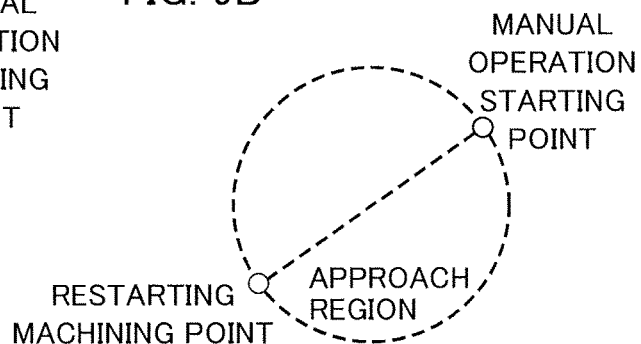

FIGS. 9A, 9B are diagrams showing an example where the approach region is set, when the operator stops the automatic operation approach during the automatic operation approach to the restarting machining point to conduct manual operation approach. The approach region is set as, a rectangular solid space with the diagonal line having the apexes of the tool position at start of the manual operation approach and the restarting machining point (FIG. 9A), or a spherical space such that the both ends of the diameter are the tool point at the start of the manual operation approach and the restarting machining point (FIG. 9B). The diameter or the diagonal line shows the distance between the tool position at start of the manual operation approach and the restarting machining point, and the examples based on idea that it will not be dangerous even if the automatic operation approach is conducted, when the tool comes nearer to the restarting machining point to the start position of the manual operation.

Figure 10:
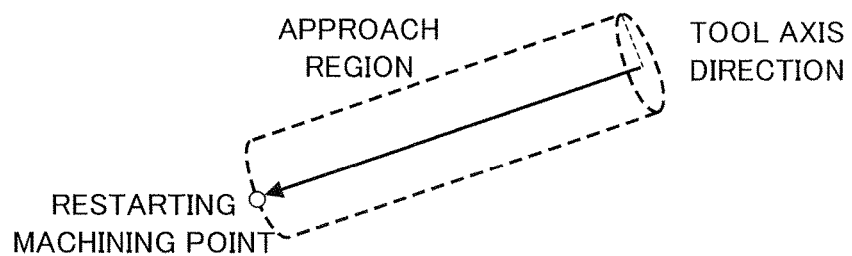
FIG. 10 is a diagram showing an example where the approach region is set based on the tool axis direction at the restarting machining point according to an embodiment of the present invention.

FIG. 10 is a diagram showing an example where the approach region is set as a cylindrical space within a predetermined distance from a line of the tool axis direction at the restarting machining point passing through the restarting machining point. The example bases on idea that there is safe region for the automatic machining approach along the tool axis direction at the restarting of the machining, due to the nature of the machining by the machining tool where the machining is conducted along the tool axis direction.

The length and radius of the cylinder may be preset in setting region of the numerical control machine, or may be configured to be designated by parameter, signal, modal value commanded in the program, or the like.

The embodiments according to the present invention are described above. The present invention is not limited to the above described embodiments and may be implemented in other modified embodiments. For example, the way to set the approach region is not limited to the three examples of setting the approach region described above, and the approach region, which is thought to be safe for the automatic operation approach, may be set according to the characteristic of the machining tool and machining method.

The invention claimed is:

1. A numerical control device for moving a tool to a restarting machining point when restarting machining after machining interruption based on machining program, the numerical control device comprising:

an approach path calculation unit configured to calculate an approach path to the restarting machining point of the tool;

a manual operation approach command unit configured to receive a manual operation approach instruction by an operator; and an approaching operation switching unit configured to switch automatic operation approach and manual operation approach, wherein approaching operation switching unit is further configured to determine when the tool is within a predetermined approach region for safely moving the tool to the restarting machining point by automatic operation, the predetermined approach region is an area based on both (i) the restarting machining point and (ii) a manual operation starting point, the manual operation starting point being a point when the operator stops the automatic operation approach during the automatic operation approach to conduct manual operation approach, wherein the approaching operation switching unit is configured to receive switching request from the operator during the manual operation approach and switch to the automatic operation approach, or receive manual intervention by the operator during the automatic operation approach and switch to the manual operation approach.

2. The numerical control device according to claim 1, wherein the approach path calculation unit configured to calculate the approach path such that:

the tool, the axis thereof set in a tool axis direction at a point of the machining interruption, is moved to a nearest point along a line of the tool axis direction passing through the restarting machining point, and the tool is moved along the tool axis direction from the point of the machining interruption to the restarting machining point.

3. The numerical control device according to claim 1, further comprising:

an approach region storing unit configured to define a plurality of approach regions, including the predetermined approach region, as a tool position range of the tool, the tool is configured to be safely moved therefrom to the restarting machining point by automatic operation, wherein the approaching operation switching unit is further configured to output a warning when a current position of the tool is outside of the predetermined approach region at a point of receiving an approach command by the automatic operation approaching.

4. The numerical control device according to claim 2, further comprising:

an approach region storing unit configured to define a plurality of approach regions, including the predetermined approach region, as a tool position range of the tool, the tool is configured to be safely moved therefrom to the restarting machining point by automatic operation, wherein the approaching operation switching unit is further configured to output a warning when a current position of the tool is outside of the predetermined approach region at a point of receiving an approach command by the automatic operation approaching.

5. A numerical control device for moving a tool to a restarting machining point when restarting machining after machining interruption based on machining program, the numerical control device comprising:

an approach path calculation unit configured to calculate an approach path to the restarting machining point of the tool, wherein the approach path calculation unit configured to calculate the approach path such that:

the tool, the axis thereof set in a tool axis direction at a point of the machining interruption, is moved to a nearest point along a line of the tool axis direction passing through the restarting machining point, and the tool is moved along the tool axis direction from the point of the machining interruption to the restarting machining point;

a manual operation approach command unit configured to receive a manual operation approach instruction by an operator; and an approaching operation switching unit configured to switch automatic operation approach and manual operation approach, wherein approaching operation switching unit is further configured to determine when the tool is within a predetermined approach region for safely moving the tool to the restarting machining point by automatic operation, wherein the predetermined approach region is a volume within a predetermined distance from a line of the tool axis direction at the restarting machining point passing through the restarting machining point, wherein the approaching operation switching unit is configured to receive switching request from the operator during the manual operation approach and switch to the automatic operation approach, or receive manual intervention by the operator during the automatic operation approach and switch to the manual operation approach.

* * * * *